(12) United States Patent
Gotanda

(10) Patent No.: US 12,417,680 B2
(45) Date of Patent: Sep. 16, 2025

(54) INFORMATION PROCESSING APPARATUS AND INFORMATION PROCESSING METHOD

(71) Applicant: Toshiba Tec Kabushiki Kaisha, Tokyo (JP)

(72) Inventor: Tsuyoshi Gotanda, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/454,682

(22) Filed: Aug. 23, 2023

(65) Prior Publication Data
US 2024/0161587 A1 May 16, 2024

(30) Foreign Application Priority Data
Nov. 15, 2022 (JP) ................................ 2022-182742

(51) Int. Cl.
*G06Q 20/20* (2012.01)
*G06Q 20/18* (2012.01)
(Continued)

(52) U.S. Cl.
CPC ............. *G07G 1/009* (2013.01); *G06V 10/16* (2022.01); *G06V 10/26* (2022.01); *G06V 20/64* (2022.01); *G07G 1/01* (2013.01)

(58) Field of Classification Search
CPC .. G06Q 10/087; G06Q 30/0643; G06Q 30/06; G06Q 30/0278; G06Q 30/0641;
(Continued)

(56) References Cited

U.S. PATENT DOCUMENTS

2012/0127316 A1* 5/2012 Kundu ..................... G07G 3/00
348/150
2012/0284132 A1* 11/2012 Kim ....................... G06Q 20/18
235/375
(Continued)

FOREIGN PATENT DOCUMENTS

EP          4177848 A1 *  5/2023  ........... G06K 9/6215
JP        2019061453 A    4/2019
WO   WO-2015112108 A1 *  7/2015  ........... G02B 27/017

OTHER PUBLICATIONS

Wang, "Evaluation of an Augmented Reality Embedded On-line Shopping System" (Year: 2015).*
(Continued)

*Primary Examiner* — Thien T Mai
(74) *Attorney, Agent, or Firm* — Kim & Stewart LLP

(57) ABSTRACT

An information processing apparatus according to an embodiment for point-of-sale systems includes a communication interface for connecting to a communication network and a processor. The processor is configured to acquire an image of an inside of a shopping basket via the communication interface, detect a commodity in the shopping basket in the acquired image, receive a commodity identification for a registered commodity in a sales transaction, and, if the commodity identification for the registered commodity is received within a preset time period around the detection of the commodity in the shopping basket, generate a screen image by superimposing commodity information associated with the commodity identification for the registered commodity on the image of the inside of the shopping basket for enabling a user to identify the commodity in the shopping basket in conjunction with the superimposed commodity information.

17 Claims, 12 Drawing Sheets

(51) Int. Cl.
*G06Q 30/0601* (2023.01)
*G06V 10/10* (2022.01)
*G06V 10/26* (2022.01)
*G06V 20/64* (2022.01)
*G07G 1/00* (2006.01)
*G07G 1/01* (2006.01)

(58) Field of Classification Search
CPC ............ G06Q 30/0639; G06Q 20/208; G06Q 20/201; G06Q 30/0633; G06Q 30/02; G06Q 30/0238; G06Q 30/0623; G06Q 10/0875; G06V 20/64; G06V 10/764; G06V 10/26; G06V 10/16; G06V 40/172; G06V 40/168; G06V 40/165; G06V 40/161; G07G 1/0036; G07G 1/0063; G07G 1/01; G07G 1/009
See application file for complete search history.

(56) References Cited

U.S. PATENT DOCUMENTS

| | | | |
|---|---|---|---|
| 2014/0100994 A1* | 4/2014 | Tatzel | G06Q 30/0276 705/27.1 |
| 2018/0150899 A1* | 5/2018 | Waldron | G06F 3/017 |
| 2020/0134697 A1* | 4/2020 | Aoyama | G07G 1/145 |
| 2020/0226380 A1* | 7/2020 | Barras | G06Q 30/0623 |
| 2021/0374836 A1* | 12/2021 | Bronicki | H04N 7/181 |

OTHER PUBLICATIONS

Virtual information kiosk using augmented reality for easy shopping (Year: 2018).*

* cited by examiner

FIG. 3

| | |
|---|---|
| TRANSACTION CODE | ~ FAA |
| TERMINAL CODE | ~ FAB |
| CUSTOMER CODE | ~ FAC |
| COMMODITY DATA | ~ FAD |
| COMMODITY DATA | ~ FAE |
| ⋮ | |

← DAA

FIG. 4

| | |
|---|---|
| TAG CODE | ~ FBA |
| DISPLAY INFORMATION | ~ FBB |
| DISPLAY POSITION | ~ FBC |
| DISPLAY FLAG | ~ FBD |

← REA

INFORMATION PROCESSING APPARATUS AND INFORMATION PROCESSING METHOD

CROSS-REFERENCE TO RELATED APPLICATION

This application is based upon and claims the benefit of priority from Japanese Patent Application No. 2022-182742, filed Nov. 15, 2022, the entire contents of which are incorporated herein by reference.

FIELD

Embodiments described herein relate generally to an information processing apparatus and an information processing method for retail transactions and the like.

BACKGROUND

There is a system in which transaction processing is performed by using an information communication terminal owned by a customer, such as a smartphone, or an information communication terminal loaned to the customer by a store as a user interface. Alternatively, a transaction processing system may use an information communication terminal attached to a shopping cart provided in the store as a user interface.

In such transaction processing systems, since an operation for registering a commodity in the transaction can be performed by the customer at any place in the store a store clerk may not notice an inappropriate registration. And even the customer may not notice when the registration of a commodity was not appropriately performed due to an erroneous operation or the like.

In view of such a circumstance, it is desirable to prevent the erroneous operation from going unnoticed when the customer performs the operations for registering the commodities in a transaction.

BRIEF DESCRIPTION OF THE DRAWINGS

FIG. 3 is a diagram schematically showing a configuration of transaction data.

FIG. 4 is a diagram schematically showing a structure of a data record included in a tag table.

DETAILED DESCRIPTION

In general, according to embodiments, an information processing apparatus and an information processing method capable of preventing an erroneous operation from going unnoticed when a customer performs an operation for registering a commodity.

According to one embodiment, an information processing apparatus for point-of-sale systems includes a communication interface for connecting to a communication network and a processor. The processor is configured to acquire an image of an inside of a shopping basket via the communication interface, detect a commodity in the shopping basket in the acquired image, receive a commodity identification for a registered commodity in a sales transaction, and, if the commodity identification for the registered commodity is received within a preset time period around the detection of the commodity in the shopping basket, generate a screen image by superimposing commodity information associated with the commodity identification for the registered commodity on the image of the inside of the shopping basket for enabling a user to identify the commodity in the shopping basket in conjunction with the superimposed commodity information.

Hereinafter, an example of an embodiment will be described with reference to the drawings.

Figure 1:
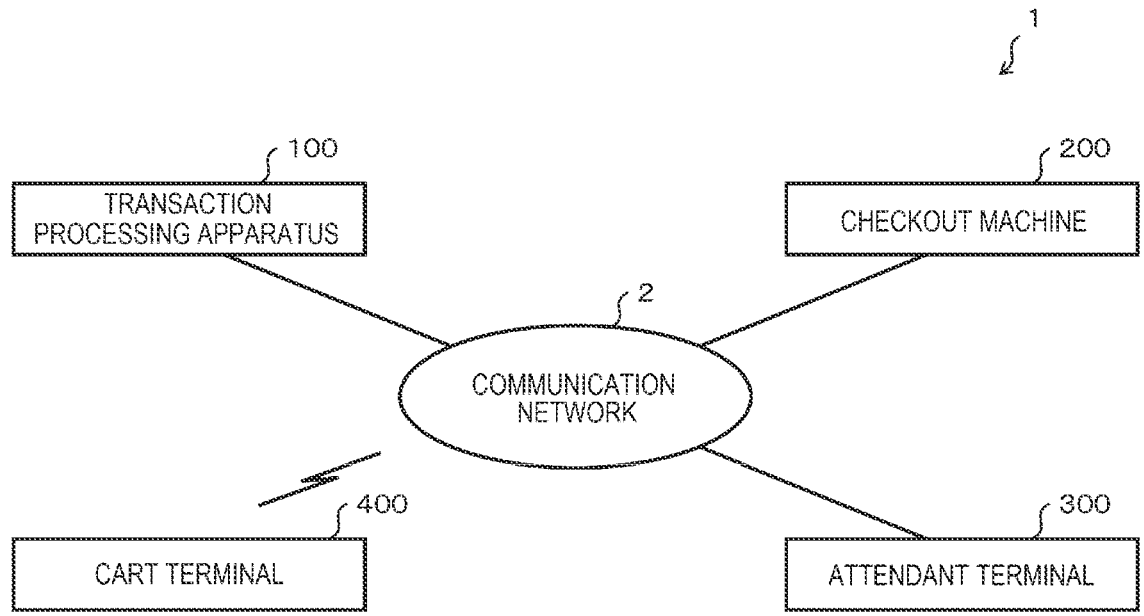
FIG. 1 is a block diagram showing a schematic configuration of a transaction processing system according to an embodiment.

FIG. 1 is a block diagram showing a schematic configuration of a transaction processing system 1 according to an embodiment.

The transaction processing system 1 has a transaction processing apparatus 100, a checkout machine 200, an attendant terminal 300, and a cart terminal 400, each of which can communicate with one another via a communication network 2.

The Internet, a virtual private network (VPN), a local area network (LAN), a public communication network, a mobile communication network, and the like can be appropriately used alone or in combination as the communication network 2. For example, the Internet and the mobile communication network are used in combination as the communication network 2.

Any number of the transaction processing apparatuses 100, the checkout machines 200, the attendant terminals 300, and the cart terminals 400 may be provided in the transaction processing system 1, but only one transaction processing apparatus 100, one checkout machine 200, one attendant terminal 300, and one cart terminal 400 are depicted in FIG. 1 as representative of multiple instances of such components.

The transaction processing apparatus 100 is an information processing apparatus that performs information processing, by using the checkout machine 200 and the cart terminal 400 as user interface terminals for providing a transaction processing service for processing a trade (sales) transaction of a commodity between a customer and a store according to an operation performed by the customer in the store. The transaction processing apparatus 100 is implemented as, for example, a cloud server, and may provide the transaction processing services in a plurality of stores. In other examples, the transaction processing apparatus 100 may be implemented as a local server, and may provide the transaction processing service only in one store.

The checkout machine 200 is installed in the store and executes checkout processing related to checkout (payment) for a transaction processed by the transaction processing apparatus 100. The checkout machine 200 receives an operation from an operator in the checkout processing. The operator of the checkout machine 200 is generally the customer. A store clerk may be the operator of the checkout machine 200 in some instances.

The attendant terminal 300 is an information processing terminal operated by the store clerk. The attendant terminal 300 is a terminal device for a user interface related to information processing for supporting work of the store clerk related to the transaction processed by the transaction processing system 1. The work of the store clerk is, for example, work of monitoring an execution status of the transaction being processed and appropriately supporting the customer.

The cart terminal 400 is an information processing terminal attached to a shopping cart (hereinafter referred to as a cart) provided in the store. The cart terminal 400 is rented to the customer together with the cart. The cart terminal 400 is a terminal device that receives an operation from the customer for the transaction processing in the transaction processing apparatus 100. The cart terminal 400 may include an information communication terminal that is rented to the customer from the store and carried and used by the customer.

Figure 2:
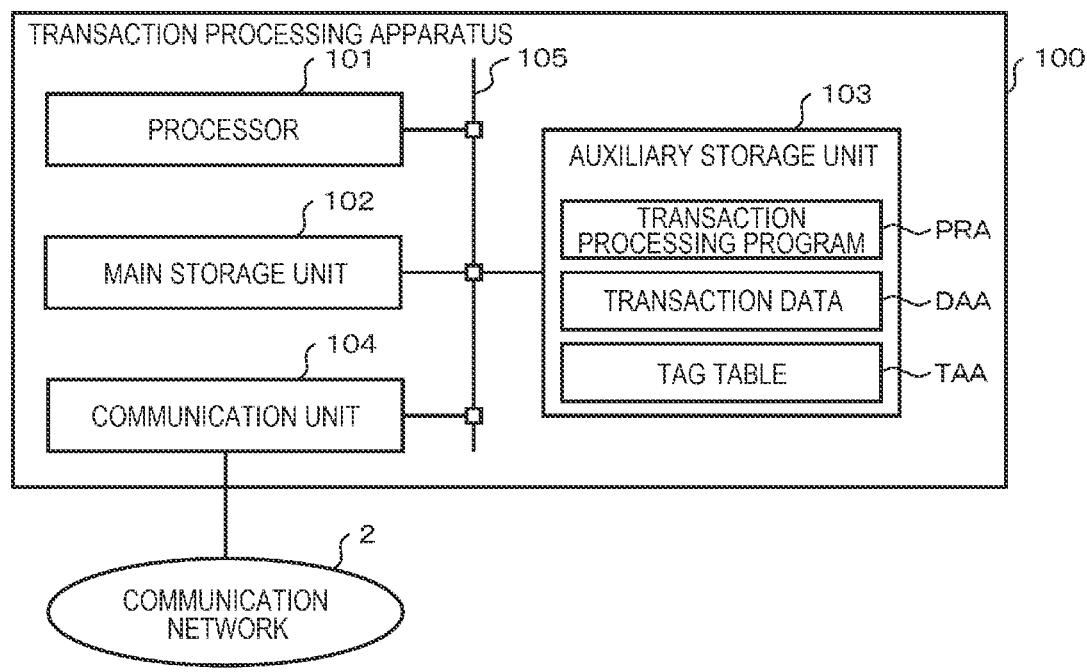
FIG. 2 is a block diagram of a transaction processing apparatus.

FIG. 2 is a block diagram of the transaction processing apparatus 100.

The transaction processing apparatus 100 includes a processor 101, a main storage unit 102, an auxiliary storage unit 103, a communication unit 104, and a transmission path 105. The processor 101, the main storage unit 102, the auxiliary storage unit 103, and the communication unit 104 can communicate with one another via the transmission path 105.

The transaction processing apparatus 100 is a computer including the processor 101, the main storage unit 102, and the auxiliary storage unit 103 connected by the transmission path 105.

The processor 101 executes information processing for controlling sub-units to implement various functions of the transaction processing apparatus 100 according to an operating system and information processing programs such as an application program.

The main storage unit 102 includes a read-only memory area and a rewritable memory area. The main storage unit 102 stores a part of the information processing programs in the read-only memory area. The main storage unit 102 may store data, in the read-only memory area or the rewritable memory area, necessary for the processor 101 to execute processing for controlling the units. The main storage unit 102 uses the rewritable memory area as a work area for the processor 101.

As the auxiliary storage unit 103, for example, an electric erasable programmable read-only memory (EEPROM), a hard disc drive (HDD), a solid-state drive (SSD), or various other storage devices can be used. The auxiliary storage unit 103 stores data used when the processor 101 executes various types of processing and data generated by the processing executed by the processor 101. The auxiliary storage unit 103 may store the information processing program. In the present embodiment, the auxiliary storage unit 103 stores a transaction processing program PRA which is an information processing program. The transaction processing program PRA is an application program implementing a procedure of information processing (hereinafter, referred to as transaction processing) for registration of a commodity (hereinafter, referred to as a transaction commodity) that is a transaction target and settlement of a price of the registered transaction commodity. Further, the transaction processing program PRA provides instructions for a procedure of tag management processing. A part of a storage area of the auxiliary storage unit 103 is used as an area for storing transaction data DAA and tag table TAA. The transaction data DAA is data representing a content of one transaction. The tag table TAA is a data table for managing tags for a transaction.

The communication unit 104 executes communication processing for performing data communication via the communication network 2. As the communication unit 104, for example, an existing wired communication device for the Internet can be used. As the communication unit 104, a wireless communication device connected to the communication network 2 by wireless communication may be used instead of or in addition to the wired communication device.

The transmission path 105 includes an address bus, a data bus, a control signal line, and the like, and transmits data and a control signal transmitted and received among connected units.

FIG. 3 is a diagram schematically showing a configuration of the transaction data DAA.

The transaction data DAA is generated for each transaction being processed in the transaction processing apparatus 100 and stored in the auxiliary storage unit 103. Thus, the auxiliary storage unit 103 may store no transaction data DAA, and the auxiliary storage unit 103 may simultaneously store a plurality of pieces of transaction data DAA.

The transaction data DAA includes fields FAA, FAB, and FAC. The transaction data DAA may include any number of fields after the field FAC. A transaction code as an identifier of the transaction is set in the field FAA. A terminal code as an identifier of the cart terminal 400 used in the transaction is set in the field FAB. A customer code as an identifier of the customer who performs the transaction is set in the field FAC. When there is a commodity registered as the transaction commodity, fields FAD, FAE, and so on associated with the transaction commodities are added to the transaction data DAA. In the fields FAD, FAE, and so on, commodity data related to each registered commodity is set separately. The commodity data includes a commodity code and a quantity. The commodity data may include various other information such as a commodity name, a unit price, and discount information.

FIG. 4 is a diagram schematically showing a structure of one data record REA included in the tag table TAA.

The tag table TAA includes the data record REA having the structure shown in FIG. 4 associated to each of the tags set for a transaction. That is, the number of data records REA included in the tag table TAA is changed according to the number of tags.

The data record REA includes fields FBA, FBB, FBC, and FBD. A tag code for each tag set for a transaction is set in the field FBA. As the tag code, a number indicating a tag setting order can be used (that is, each item placed in the cart is giving an incremental number as a tag code). The field FBC shows a display position of an AR tag corresponding to the associated tag on an augmented reality (AR) screen. A flag indicating whether to display the AR tag corresponding to the associated tag on the AR screen is set in the field FBD.

As hardware of the transaction processing apparatus 100, a general-purpose server apparatus or the like can be used. A transfer of the transaction processing apparatus 100 is generally performed with the transaction processing program PRA already stored in the auxiliary storage unit 103 but the transaction data DAA and the tag table TAA not yet stored in the auxiliary storage unit 103. The transaction processing program PRA may be transferred separately from the hardware. In some examples, an existing application program of the same general type but a different version may be stored in the auxiliary storage unit 103, but then updated or modified to be a transaction processing program PRA. The transaction processing apparatus 100 may be implemented by writing the transaction processing program PRA into the auxiliary storage unit 103 according to any operation of the operator. The transaction processing program PRA can be transferred by being recorded on a removable recording medium such as a magnetic disk, a magneto-optical disk, an optical disk, or a semiconductor memory, or by communication via a network.

Figure 5:
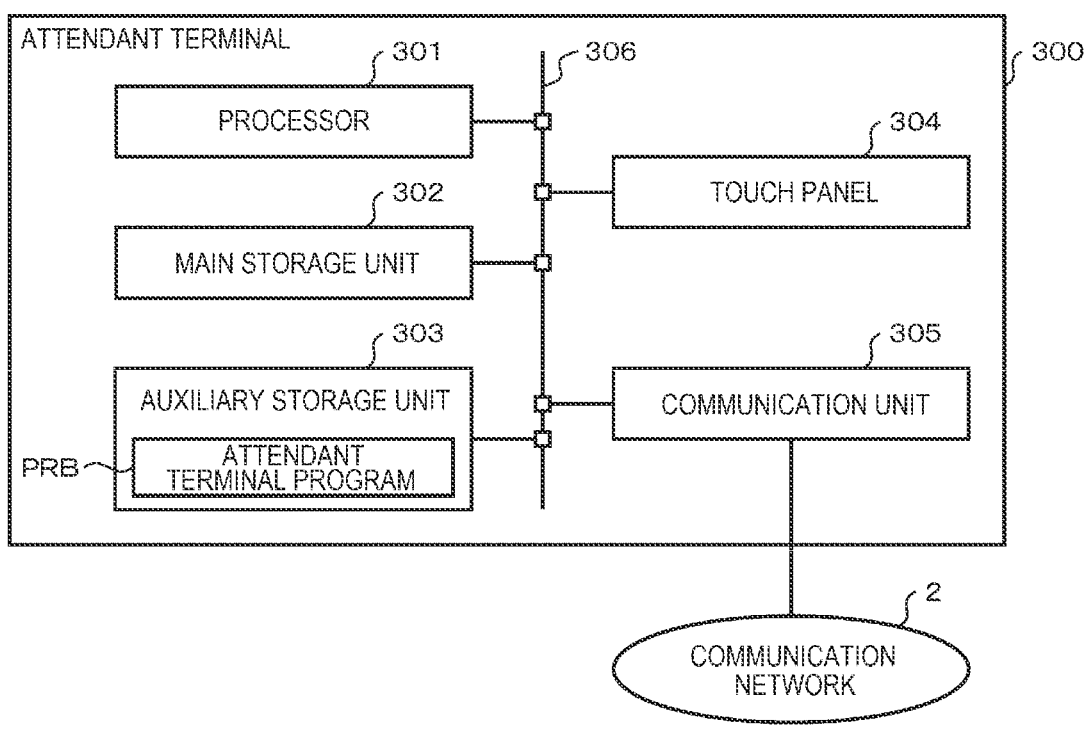
FIG. 5 is a block diagram of an attendant terminal.

FIG. 5 is a block diagram of the attendant terminal 300.

The attendant terminal 300 includes a processor 301, a main storage unit 302, an auxiliary storage unit 303, a touch panel 304, a communication unit 305, and a transmission path 306.

Functions of the processor 301, the main storage unit 302, the auxiliary storage unit 303, the communication unit 305, and the transmission path 306 are substantially the same as those described for the processor 101, the main storage unit 102, the auxiliary storage unit 103, and the transmission path 105. However, the auxiliary storage unit 303 stores an attendant terminal program PRB instead of the transaction processing program PRA. The attendant terminal program PRB is an application program describing a procedure of information processing of the processor 301 for operating the attendant terminal 300 as a user interface for the store clerk who supports the transaction processed by the transaction processing apparatus 100.

The touch panel 304 displays a screen for information presentation to the operator of the attendant terminal 300. Further, the touch panel 304 inputs an instruction by a touch operation performed by the operator on the screen.

As hardware of the attendant terminal 300, for example, a stationary computer device (e.g., desktop computer) may be used. In other examples, as the hardware of the attendant terminal 300, a tablet information processing apparatus or a portable information processing apparatus such as a smartphone may be used.

Figure 6:
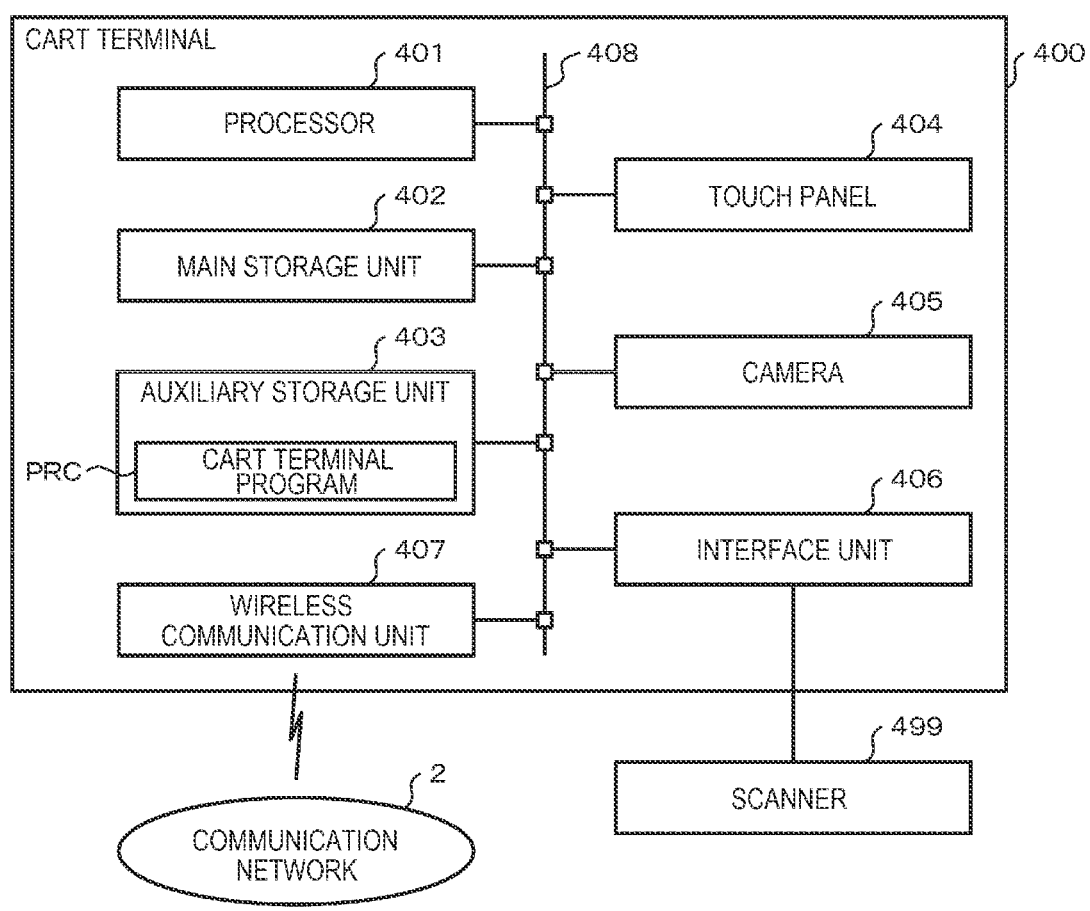
FIG. 6 is a block diagram of a cart terminal.

FIG. 6 is a block diagram of the cart terminal 400.

The cart terminal 400 includes a processor 401, a main storage unit 402, an auxiliary storage unit 403, a touch panel 404, a camera 405, an interface unit 406, a wireless communication unit 407, and a transmission path 408.

Functions of the processor 401, the main storage unit 402, the auxiliary storage unit 403, and the transmission path 408 are substantially the same as functions of the processor 101, the main storage unit 102, the auxiliary storage unit 103, and the transmission path 105. Further, a function of the touch panel 404 is substantially the same as that of the touch panel 304. However, the auxiliary storage unit 403 stores a cart terminal program PRC instead of the transaction processing program PRA. The cart terminal program PRC is an application program describing a procedure of information processing of the processor 401 for operating the cart terminal 400 as a user interface in the transaction processing performed by the transaction processing apparatus 100.

The camera 405 images an imaging range including an entire internal space of a shopping basket placed in the cart to obtain an image. The image obtained by the camera 405 is hereinafter referred to as a camera image.

An external device such as a scanner 499 is connected to the interface unit 406. The interface unit 406 interfaces data exchange with the external device connected thereto. As the interface unit 406, an existing universal serial bus (USB) controller can be used. The scanner 499 is attached to the cart and optically scans a one-dimensional bar code, a two-dimensional bar code, and the like.

The wireless communication unit 407 executes communication processing for wirelessly performing data communication via the communication network 2. As the wireless communication unit 407, for example, an existing wireless communication device for a wireless LAN can be used. A communication unit connected to the communication network 2 by wire may be used instead of or in addition to the wireless communication unit 407.

As basic hardware of the cart terminal 400 hardware of a tablet information processing apparatus can be used.

Figure 7:
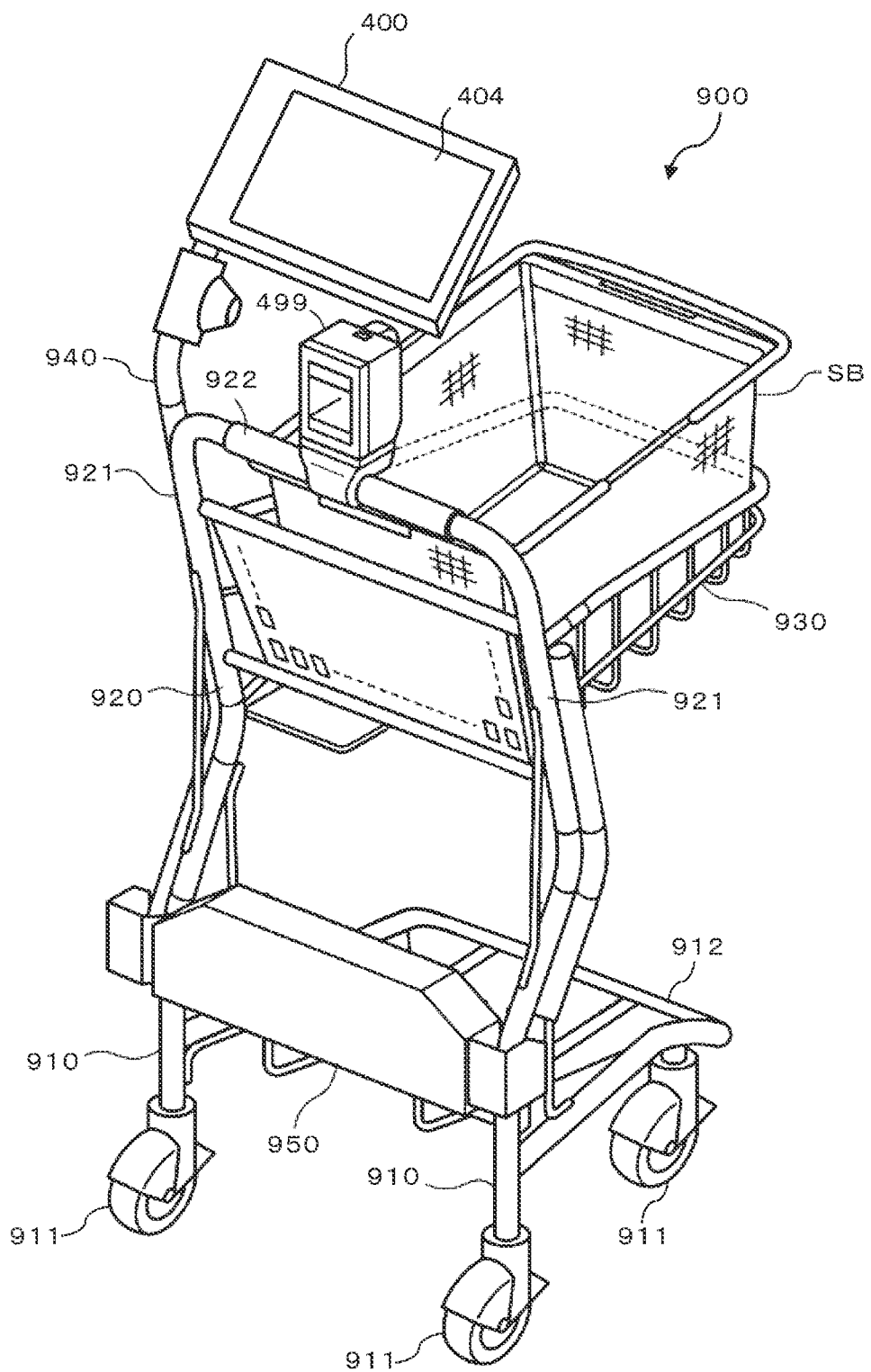
FIG. 7 is a perspective view showing an example of a cart terminal attached to a shopping cart.

FIG. 7 is a perspective view showing an example of a cart terminal 400 attached to a cart.

A cart 900 includes a caster portion 910, a handle frame portion 920, and a basket reception portion 930.

The caster portion 910 includes four wheels 911 for smoothly moving the cart 900 on a floor surface. The wheels 911 are attached to a frame 912 in a state in which each is rotatable about a vertical axis.

The handle frame portion 920 includes a pair of vertical frames 921 and 921 and a handlebar 922. The vertical frames 921 and 921 stand on two wheels of the caster portion 910. The handlebar 922 connects upper ends of the vertical frames 921 and 921.

The basket reception portion 930 is provided horizontally from an intermediate portion of the handle frame portion 920. The basket reception portion 930 holds a shopping basket SB for accommodating commodities. The caster portion 910 can also hold the shopping basket SB on the frame 912.

The customer who uses the cart 900 is typically located on a front side in FIG. 7 with respect to the handle frame portion 920. Then, the customer grips the handlebar 922 and pushes the cart 900. That is, in this case, a direction in which the basket reception portion 930 protrudes with respect to the handle frame portion 920 is an advancing direction of the cart 900.

The scanner 499 is attached to an intermediate portion of the handlebar 922. A pole 940 is attached to one of the vertical frames 921 such that a tip of the pole 940 is positioned above the handlebar 922. The cart terminal 400 is attached to a tip portion of the pole 940 in a posture in which the touch panel 404 faces an opposite side of the advancing direction. The camera 405 of the cart terminal 400 is provided toward a back side of the touch panel 404, and is not shown in FIG. 7. The camera 405 can image an inside of the shopping basket SB held by the basket reception portion 930 from above in an overhead view.

A battery case 950 is attached to a lower end side of the handle frame portion 920 between the vertical frames 921 and 921. The battery case 950 accommodates a battery used as an external power supply of the cart terminal 400.

Next, an operation of the transaction processing system 1 having the above configurations will be described. Specific content of the various types of processing are merely an example, and a change in an order of a part of processing, omission of a part of processing, addition of other processing, and the like are possible as appropriate. For example, in the following description, for easy understanding of a characteristic operation of the present embodiment, description of certain parts of processing may be omitted. For example, when an error occurs, processing for coping with the error may be performed, but a detailed description of such processing is omitted.

The customer performs a predetermined operation for starting using the cart terminal 400 from an unused state. The customer can also perform an operation for inputting the customer code to the cart terminal 400 as a part of the operation for starting using the cart terminal 400. In the cart terminal 400 that receives such an operation, the processor 401 requests the transaction processing apparatus 100 to check in. That is, for example, processor 401 transmits request data for requesting the check-in from the wireless communication unit 407 to the communication network 2, and then to the transaction processing apparatus 100. The processor 401 sets check-in data stored in the auxiliary storage unit 403 and the terminal code of the cart terminal 400 to be included in the request data. The terminal code is previously assigned to the cart terminal 400 to be distinguishable from other cart terminals 400, and is stored in, for example, the auxiliary storage unit 403. When the processor 401 receives the customer code, the processor 401 also sets the customer code to be included in the request data. The check-in data includes at least information for identifying a store in which the cart terminal 400 is used. The information is, for example, a store code defined as a store identifier. The information may be, for example, a company code for identifying a company if it is not necessary to distinguish a plurality of stores operated by the same company. The information includes, for example, the company code and the store code if the same store code can be used by different companies.

When the check-in data is transmitted to the transaction processing apparatus 100 via the communication network 2, in the transaction processing apparatus 100, the communication unit 104 receives the check-in data and temporarily stores the check-in data in the main storage unit 102 or the auxiliary storage unit 103.

In this way, when the check-in data transmitted from the cart terminal 400 is received by the transaction processing apparatus 100, the processor 101 starts the transaction processing related to one transaction according to the transaction processing program PRA.

If the processor 101 already executes transaction processing for another transaction related to a different customer, the processor 101 starts new transaction processing as processing of a thread different from that of the transaction processing. That is, the processor 101 may execute a plurality of transaction processing in parallel. However, in the following description, attention is focused only on the processing of the transaction related to one customer. Thus, the cart terminal 400 described below refers to the one cart terminal 400 being used by the customer for purposes of transaction processing.

Figure 8:
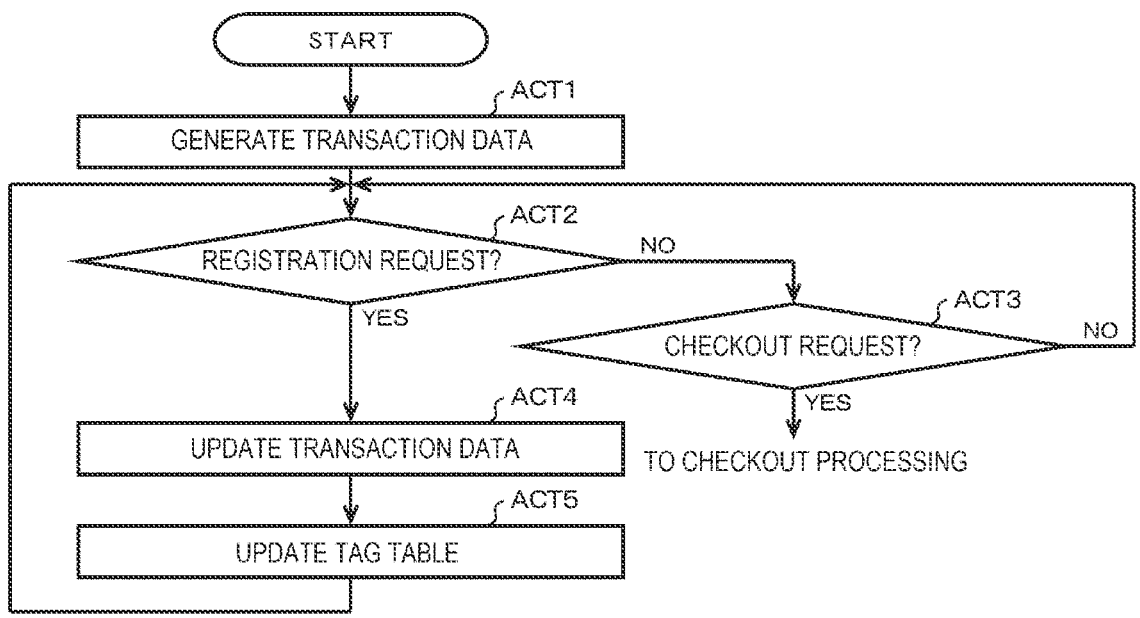
FIG. 8 is a flowchart of transaction processing.

FIG. 8 is a flowchart of the transaction processing.

In ACT 1, the processor 101 generates new transaction data DAA related to a target transaction (a new transaction). That is, for example, the processor 101 determines, according to a predetermined rule, a new transaction code different from any other transaction code used for identifying another transaction, generates the new transaction data DAA for which the transaction code is set in the field FAA and the terminal code included in the request data is set in the field FAB, and stores the new transaction data DAA in the auxiliary storage unit 103. If the customer code is included in the request data, the processor 101 sets the customer code in the field FAC of the newly generated transaction data DAA. If the customer code is not included in the request data, the processor 101 sets the field FAC to a null state or the like. Since a transaction commodity is not yet registered, the processor 101 does not set any commodity data in the newly generated transaction data DAA.

The customer searches the store for a commodity to be purchased (a transaction target). Then, when the customer registers a commodity as a new transaction commodity, the customer performs a predetermined operation for instructing the registration of the commodity on the cart terminal 400. The operation is, for example, an operation for causing the scanner 499 to scan a bar code representing a commodity code such as a Japanese article number (JAN) code placed on the commodity. The operation is, for example, an operation of tapping a preset button displayed on a display screen of the touch panel 404 and associated with the commodity. The operation is, for example, an operation of directly inputting the commodity code through the touch panel 404. According to such an operation, in the cart terminal 400, the processor 401 requests the transaction processing apparatus 100 to perform commodity registration with notification of the input commodity code.

In the transaction processing apparatus 100, the processor 101 generates the transaction data in ACT 1 in FIG. 8, and then proceeds to ACT 2.

In ACT 2, the processor 101 confirms whether a commodity registration has been requested. If not, the processor 101 determines NO and proceeds to ACT 3.

In ACT 3, the processor 101 confirms whether a checkout start has been requested. If not, the processor 101 determines NO and returns to ACT 2.

Thus, the processor 101 waits for the request for the registration in ACT 2 or the request for the checkout in ACT 3. If a registration is requested, the processor 101 determines YES in ACT 2 and proceeds to ACT 4.

In ACT 4, the processor 101 updates, according to the commodity registration request, the transaction data DAA to include the commodity data related to the commodity in the registration request, thereby registering the commodity as a transaction commodity.

In ACT 5, the processor 101 updates the tag table TAA.

When the processor 101 executes ACT 5 for the first time according to a registration instruction of a first transaction commodity, the processor 101 generates the new tag table TAA associated with the transaction, and stores the tag table TAA in the auxiliary storage unit 103. The processor 101 sets the new tag table TAA to include one data record REA associated with the tag assigned to the transaction commodity registered in ACT 2.

The processor 101 sets a tag code as determined by a predetermined rule in the field FBA of the data record REA. The rule is assumed to be a predetermined initial value such as "1". However, the rule may be appropriately set by, for example, a creator of the transaction processing program PRA.

The processor 101 sets, in the field FBB of the data record REA, display information determined by a predetermined rule related to the commodity determined as the transaction commodity by the commodity registration when a determination of YES is made in ACT 2. The rule is assumed to be, for example, a character string representing the commodity code and the commodity name of the commodity. However, the rule may be appropriately determined by, for example, the creator of the transaction processing program PRA.

The processor 101 sets information indicating that the display position is undetermined in the field FBC of the data record REA. The information may be appropriately determined by, for example, the creator of the transaction processing program PRA to be distinguishable from information indicating an actual display position.

The processor 101 sets, in the field FBD of the data record REA, a display flag of a state representing "non-display".

After updating the tag table TAA, the processor 101 returns to a standby state of ACT 2 and ACT 3. Thus, thereafter, every time the commodity registration is requested, the processor 101 repeats ACT 4 and ACT 5, and adds information related to a new transaction commodity to the transaction data DAA and the tag table TAA. When executing ACT 5 for the second or a subsequent time in this way, the processor 101 adds one data record REA associated with one tag assigned to the additionally registered transaction commodity to the tag table TAA generated as described above. The processor 101 sets the tag code determined by a predetermined rule in the field FBA of the added data record REA. The rule is assumed to be, for example, a value obtained by adding "1" to the previous maximum value of the tag codes set in the field FBA of the data record REA already included in the tag table TAA. However, the rule may be appropriately determined by, for example, the creator of the transaction processing program PRA.

When the customer completes the registration of the transaction commodity, the customer performs a predetermined operation for instructing start of checkout on the cart terminal 400. According to such an operation, in the cart terminal 400, the processor 401 requests the transaction processing apparatus 100 to start the checkout.

According to the request, in the transaction processing apparatus 100, the processor 101 determines YES in ACT 3 in FIG. 8, and proceeds to the checkout processing. The checkout processing may be, for example, processing similar to existing processing, and illustration thereof is omitted.

For example, the processor 101 instructs the cart terminal 400 to display a checkout screen. The checkout screen is a screen for the checkout machine 200 to take over the checkout processing related to the transaction. On the checkout screen, a bar code representing information for allowing the checkout machine 200 to make an inquiry related to the transaction to the transaction processing apparatus 100 is displayed.

When the cart terminal 400 is instructed to display the checkout screen, the processor 401 updates the display screen of the touch panel 404 to the checkout screen.

If a plurality of the checkout machines 200 are installed in the store, the customer freely selects the unused checkout machine 200 from the plurality of checkout machines 200, and causes a bar code scanner provided in the checkout machine 200 to read the bar code displayed on the checkout screen. Accordingly, the checkout machine 200 requests checkout data from the transaction processing apparatus 100 based on information represented by the bar code read by the bar code scanner.

When the transaction processing apparatus 100 receives the request for the checkout data, the processor 101 transmits, to the checkout machine 200, the checkout data for causing the checkout machine 200 to perform settlement of the requested transaction.

In this way, according to the checkout data transmitted from the transaction processing apparatus 100, the checkout machine 200 appropriately displays the screen and executes processing of checkout for the transaction based on the checkout data while receiving the operations from the customer related to the checkout. The processing of the checkout machine 200 may be, for example, processing similar to processing executed by a checkout machine of an existing POS system.

In addition, regarding the take-over of the checkout processing related to the transaction from the cart terminal 400 to the checkout machine 200, for example, when the cart terminal 400 approaches the specific checkout machine 200, the take-over may be implemented by transmitting the checkout data by the wireless communication. When the checkout machine 200 is in a form of a gate, the checkout data related to the transaction may be transmitted when the cart terminal 400 approaches the gate.

In the transaction processing apparatus 100, the processor 101 starts the tag management processing for the transaction according to the transaction processing program PRA in parallel with the start of the transaction processing. Thus, if the processor 101 executes a plurality of pieces of the transaction processing in parallel, the processor 101 executes a plurality of pieces of the tag management processing in parallel. However, in the following description, attention is focused only on the tag management processing for one transaction.

The tag management processing may be executed based on an application program different from the transaction processing program PRA.

Figure 9:
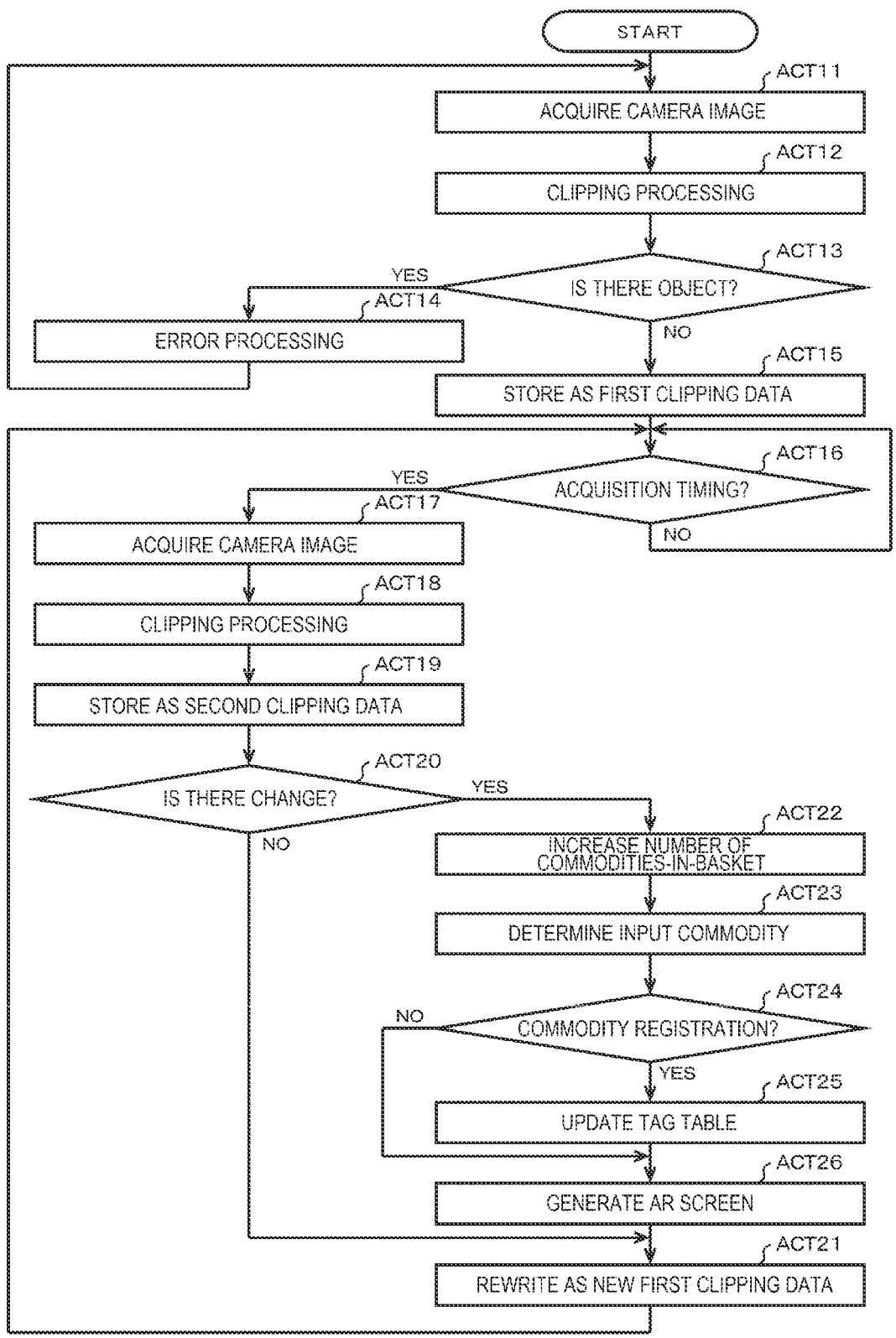
FIG. 9 is a flowchart of tag management processing.

FIG. 9 is a flowchart of the tag management processing.

In ACT 11, the processor 101 acquires the camera image from the cart terminal 400. For example, the processor 101 transmits instruction data for instructing the transmission of the camera image from the communication unit 104 to the communication network 2, and then to the cart terminal 400.

When the instruction data is transmitted to cart terminal 400 via the communication network 2 and received by the wireless communication unit 407, the processor 401 transmits the camera image obtained by the camera 405 from the wireless communication unit 407 to the communication network 2, and then to the transaction processing apparatus 100.

In the transaction processing apparatus 100, when the camera image is transmitted to the transaction processing apparatus 100 via the communication network 2 and received by the communication unit 104, the processor 101 stores the camera image in the main storage unit 102 or the auxiliary storage unit 103. Here, the shopping basket SB is a container for accommodating the commodity registered as the transaction target. The camera image is an image obtained by imaging the inside of the shopping basket SB as the container. Thus, the processor 101 executes the information processing based on the transaction processing program PRA and thus functions as an acquisition unit.

In ACT 12, the processor 101 performs clipping processing on the acquired camera image. The clipping processing is processing for clipping out individual objects included in the camera image. As the clipping processing, for example, a known image processing technique for clipping out an object shown in an image can be used. In this example, the clipping processing is not performed until it is determined what the clipped object is.

In ACT 13, the processor 101 confirms whether there is an object clipped out by the clipping processing. Then, if at least one object is clipped out, the processor 101 determines YES and proceeds to ACT 14.

The tag management processing is started when the cart terminal 400 is started to be used by the customer. The commodity registration is not yet started when the camera image acquired in ACT 11 is first captured, and in this state, a commodity has not yet been put in the shopping basket SB. It is desirable to require the shopping basket SB to be empty when the cart terminal 400 is first started as a use rule of the cart terminal 400 and inform the customer of this use rule.

In order to inform the customer of the use rule, in the cart terminal 400, when an operation for use start is received, the processor 401 may cause the touch panel 404 to display a screen for guiding the customer to empty the shopping basket SB. The screen display may be autonomously performed by the processor 401, or may be performed according to an instruction from the processor 101 of the transaction processing apparatus 100. Therefore, no object should be included in the camera image acquired in ACT 11, and if an object is clipped out by the clipping processing in ACT 12, the object has been placed in the shopping basket SB against the use rule.

In ACT 14, the processor 101 performs predetermined error processing to account for the presence of the object at a use startup. The error processing is processing for coping with a rule violation or the like, and what processing is to be performed may be appropriately determined by, for example, the creator of the transaction processing program PRA. For example, the processor 101 may instruct the cart terminal 400 to display, on the touch panel 404, a screen for guiding the customer to empty the shopping basket SB. Then, once a predetermined error cancellation condition is satisfied, the processor 101 returns to ACT 11. It is assumed that the cancellation condition is, for example, a case where the cart terminal 400 notifies that a predetermined operation has been performed to declare that the guide on the screen for guiding the customer to empty the shopping basket SB has been confirmed. Alternatively, the cancellation condition is assumed to be, for example, a case where a predetermined waiting period ends.

If no object can be clipped out by the clipping processing in ACT 12, the processor 101 determines NO in ACT 13 and proceeds to ACT 15.

In ACT 15, the processor 101 stores data representing a result of the clipping processing in ACT 12 in the main storage unit 102 or the auxiliary storage unit 103 as first clipping data.

In ACT 16, the processor 101 waits for an acquisition timing. The acquisition timing is, for example, a time at which a predetermined time elapses since the camera image is acquired last time. However, the acquisition timing may be appropriately determined by, for example, the creator of the transaction processing program PRA. Then, if the acquisition timing is reached, the processor 101 determines YES in ACT 16 and proceeds to ACT 17.

In ACT 17, the processor 101 acquires the camera image. The processing may be similar to that in, for example, ACT 11.

In ACT 18, the processor 101 performs the clipping processing. The processing may be similar to that in, for example, ACT 12.

In ACT 19, the processor 101 stores data representing a result of the clipping processing in ACT 18 in the main storage unit 102 or the auxiliary storage unit 103 as second clipping data.

In ACT 20, the processor 101 confirms whether there is a change in the second clipping data with respect to the first clipping data. If there is no difference between the first clipping data and the second clipping data, the processor 101 determines NO and proceeds to ACT 21.

In ACT 21, the processor 101 rewrites the second clipping data as new first clipping data. Then, the processor 101 returns to a standby state of ACT 16.

Thus, the processor 101 repeatedly acquires the camera image at each acquisition timing, and waits for a change between the clipping result related to the latest camera image and the clipping result related to the immediately previous camera image.

Figure 10:
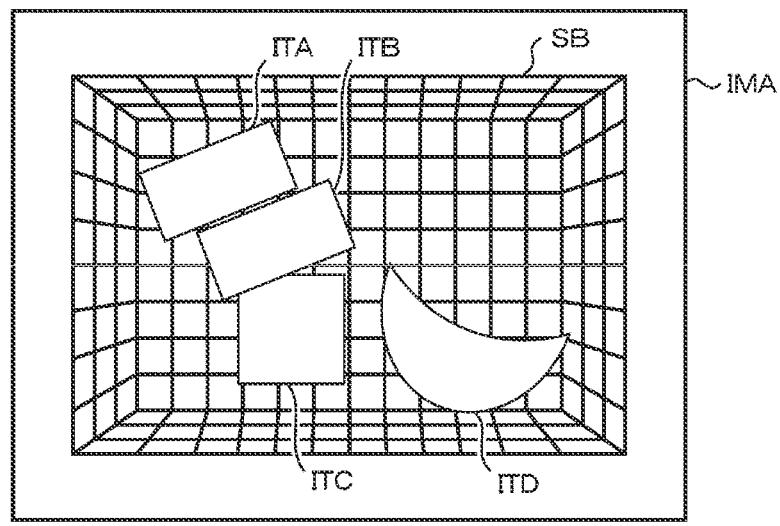
FIG. 10 is a diagram showing a camera image.

FIG. 10 is a view showing a camera image IMA as an example. All of the drawings, including FIG. 10, of camera images are simplified.

The camera image IMA is captured in a state in which commodities ITA, ITB, ITC, and ITD have already been placed in the shopping basket SB.

Figure 11:
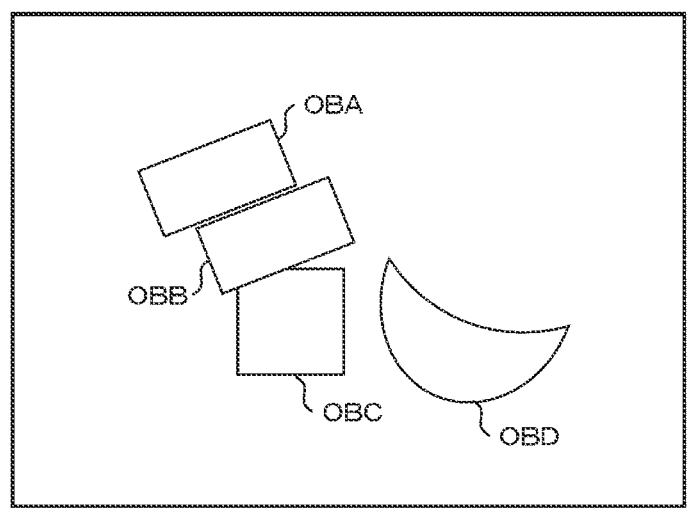
FIG. 11 is a diagram showing a clipping result.

FIG. 11 is a diagram showing the clipping result as an example. The clipping result shown in FIG. 11 is a result of performing the clipping processing on the camera image IMA shown in FIG. 10. Therefore, objects OBA, OBB, OBC, and OBD are clipped out corresponding to the commodities ITA, ITB, ITC, and ITD, respectively.

Figure 12:
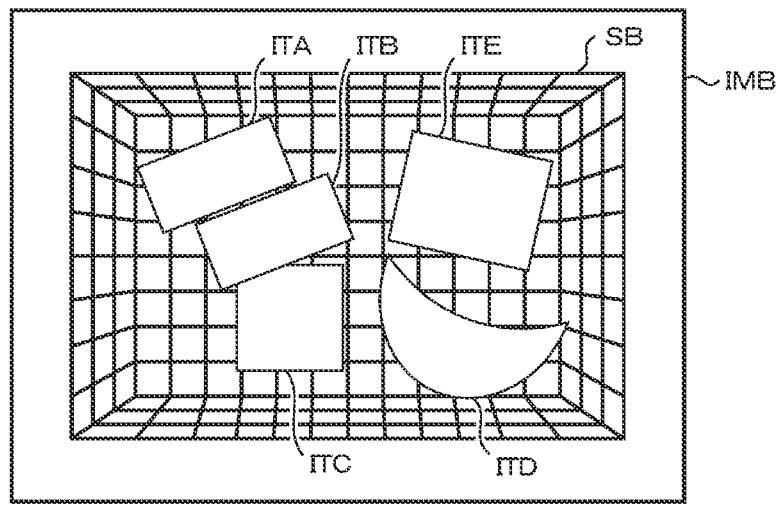
FIG. 12 is a diagram showing a camera image.

FIG. 12 is a diagram showing a camera image IMB as an example. The camera image IMB is captured in a state in which the commodities ITA, ITB, ITC, and ITD, and a commodity ITE have been placed in the shopping basket SB. That is, the camera image IMB is captured after the commodity ITE has been newly put into the shopping basket SB and thus differs in this from the state in which the camera image IMA was captured.

Figure 13:
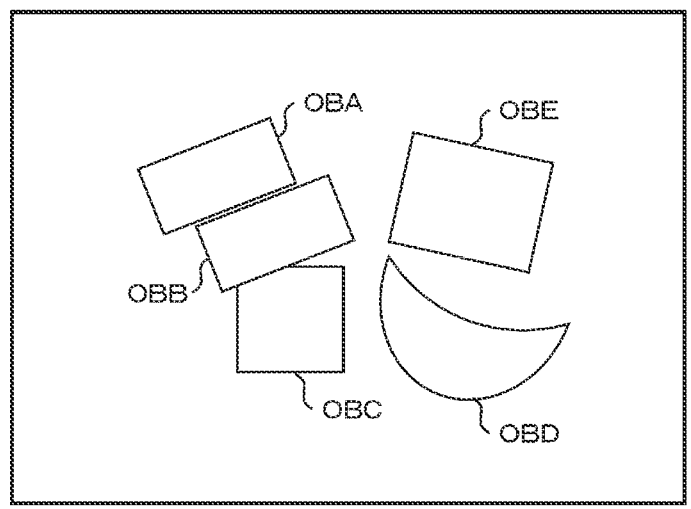
FIG. 13 is a diagram showing a clipping result.

FIG. 13 is a diagram showing another clipping result as an example. The clipping result shown in FIG. 13 is a result of performing the clipping processing on the camera image IMB shown in FIG. 12. Therefore, the objects OBA, OBB, OBC, and OBD, and an object OBE are clipped out corresponding to the commodities ITA, ITB, ITC, ITD, and ITE, respectively.

Thus, if the first clipping data represents the clipping result as shown in FIG. 11 and the second clipping data represents the clipping result as shown in FIG. 13, there is a significant (noticeable) difference between these two pieces of clipping data. In this case, the processor 101 determines YES in ACT 20 and proceeds to ACT 22. At this time, the processor 101 detects the commodities put into the shopping basket SB based on the image of the inside of the shopping basket SB. Thus, the processor 101 executes the information processing based on the transaction processing program PRA and thus functions as a detection unit.

In ACT 22, the processor 101 increases the number of commodities-in-basket by one. Although not explicitly depicted, the processor 101 generally clears (reinitializes) the number of commodities-in-basket to 0 before ACT 22 is executed for the first time, for example, at the start of the tag management processing. That is, the number of commodities-in-basket is the number of commodities which have been detected to be put into the shopping basket SB during the transaction processing.

In ACT 23, the processor 101 determines which of the objects clipped out by the clipping processing in ACT 18 is a newly placed commodity. If the first clipping data represents the clipping result as shown in FIG. 11 and the second clipping data represents the clipping result as shown in FIG. 13, the processor 101 determines the object OBE as the newly input/placed commodity.

In ACT 24, the processor 101 checks whether the commodity registration for the new commodity has been performed. For example, it may be set as the use rule of the cart terminal 400 that the commodity registered as the transaction commodity must be quickly put into the shopping basket SB or a commodity put into the shopping basket must be quickly registered as a transaction commodity. If the transaction commodity is registered at a time close to the placing of the newly input commodity determined as described above, the processor 101 determines that a commodity registration related to the newly input commodity was performed. More specifically, for example, if a new commodity registration is performed in the same transaction within an allowable period starting from a time earlier than a capturing time of the camera image acquired in ACT 17 to a time no later than a predetermined time, the processor 101 determines YES, which means the commodity registration was performed, and proceeds to ACT 25.

In ACT 25, the processor 101 updates the tag table TAA. For example, the processor 101 sets the display position determined according to a predetermined rule in the field FBC of the data record REA added to the tag table TAA in ACT 5 in FIG. 8 related to the commodity registration when the determination is YES in ACT 24. For example, the rule is determined in advance to be in the vicinity of a position where the object corresponding to the currently input commodity was clipped out from the camera image. For example, the processor 101 determines the display position such that a position of a center of mass of a region clipped out as the object is a center position for a tag. However, the rule may be appropriately varied by, for example, the creator of the transaction processing program PRA.

Further, for example, the processor 101 rewrites the display flag set in the field FBD of the data record REA from a state representing "non-display" to a state representing "display".

In ACT 26, the processor 101 generates the augmented reality (AR) screen. When the generation of the AR screen ends, the processor 101 repeats ACT 21 and the subsequent processing in the same manner as described above.

When the processor 101 executes ACT 25 for a second or subsequent time, the processor 101 sets the display position in the field FBC such that overlapping with other tags is reduced, for example, in consideration of the display positions set in the field FBC of the data records REA already included in the tag table TAA. At this time, the processor 101 may change a display position set in the field FBC of a data record REA already included in the tag table TAA. If there is another tag whose overlapping state with a tag that associates the data record REA to be added satisfies a predetermined condition, the processor 101 changes the display flag set in the field FBD of the data record REA associated with the tag to the state indicating "non-display". It is assumed that the condition is, for example, "a size of an overlapping region is equal to or larger than a predetermined threshold". However, the condition may be appropriately determined by, for example, the creator of the transaction processing program PRA.

Figure 14:
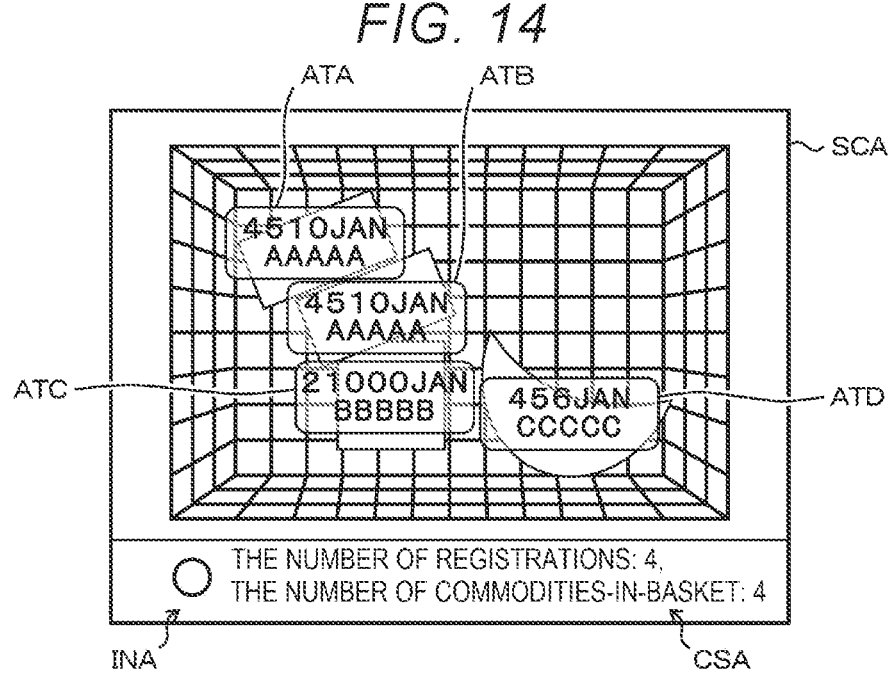
FIG. 14 is a diagram showing an AR screen.

FIG. 14 is a diagram showing an AR screen SCA as an example. The AR screen SCA is an example of a screen generated by the processor 101 through ACT 25 and ACT 26 after acquiring the camera image IMA shown in FIG. 10 in ACT 17.

The processor 101 generates the AR screen SCA by superimposing a computer graphics (CG) image showing four AR tags ATA, ATB, ATC, and ATD, an indicator INA, and a character string CSA on the camera image IMA shown in FIG. 10.

The processor 101 disposes the AR tags ATA, ATB, ATC, and ATD in the CG image according to the four data records REA for which the display flag of the state of "display" is set in the field FBD among the data records REA included in the tag table TAA. The processor 101 displays a character string corresponding to the display information set in the field FBB of the corresponding data record REA in a corresponding one of the AR tags ATA, ATB, ATC, and ATD. For example, the AR tag ATA indicates that the commodity code is "4510JAN" and the commodity name is "AAAAA". However, the "4510JAN" and "AAAAA" content here is just presented to schematically indicate a display example of the display information. The processor 101 disposes each of the AR tags ATA, ATB, ATC, and ATD at the display position set in the field FBC of the corresponding data record REA.

When the number of commodities registered as a transaction commodity (the number of registrations) matches the number of commodities-in-basket, the processor 101 disposes the indicator INA in the CG image as shown in FIG. 14.

The processor 101 disposes the character string CSA in the CG image as one representing the number of registrations and the number of commodities-in-basket.

Figure 15:
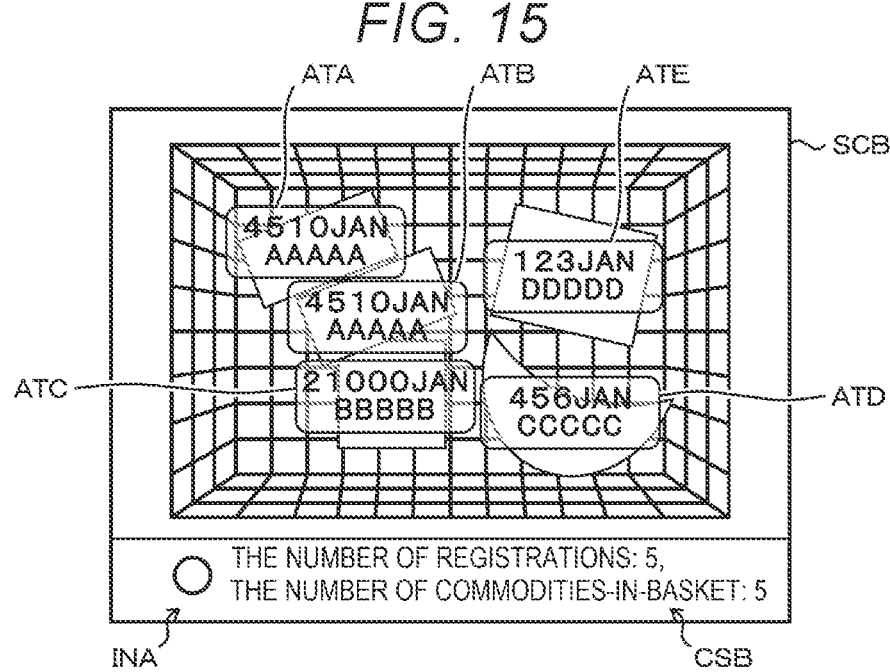
FIG. 15 is a diagram showing an AR screen.

FIG. 15 is a diagram showing an AR screen SCB as an example. The AR screen SCB is an example of the screen generated by the processor 101 through ACT 25 and ACT 26 after acquiring the camera image IMB shown in FIG. 12 in ACT 17. A CG image constituting the AR screen SCB shows five AR tags ATA, ATB, ATC, ATD, and ATE, the indicator INA, and a character string CSB.

That is, the AR screen SCB is an example of a screen updated from the AR screen SCA when the clipping result represented by the first clipping data is as shown in FIG. 11, the clipping result represented by the second clipping data is as shown in FIG. 13, and the commodity registration is performed.

The processor 101 generates the AR screen SCB by superimposing the CG image showing the five AR tags ATA, ATB, ATC, ATD, and ATE, the indicator INA, and the character string CSB on the camera image IMB shown in FIG. 12.

The processor 101 sets the CG image for the AR screen SCB to one in which an AR tag ATE associated with an object newly clipped out by the clipping result represented by the second clipping data is added and shown in addition to the AR tags ATA, ATB, ATC, and ATD shown in the CG image in the AR screen SCA.

Further, the processor 101 sets the CG image for the AR screen SCB to one in which the character string CSB is shown instead of the character string CSA shown in the CG image in the AR screen SCA according to an increase in the number of registrations and the number of commodities-in-basket.

If the processor 101 cannot confirm that the commodity registration related to the input commodity determined in ACT 23 is performed, the processor 101 determines NO in ACT 24, passes ACT 25, and proceeds to ACT 26.

At this time, since the tag table TAA is not updated, the processor 101 generates a CG image similar to the CG image generated when ACT 26 was executed the last time. Then, the processor 101 generates the AR screen in which the CG image is superimposed on the changed camera image.

Figure 16:
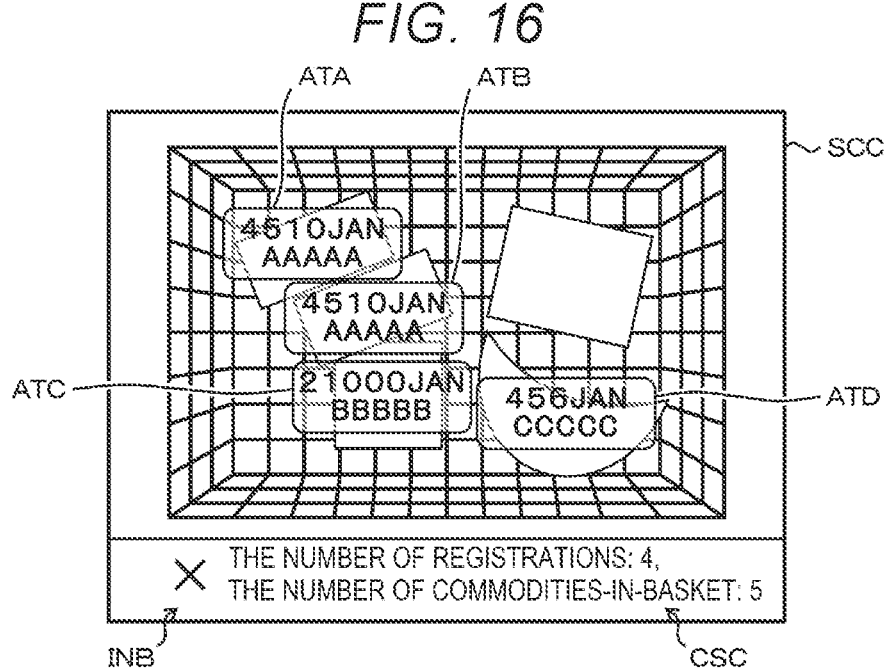
FIG. 16 is a diagram showing an AR screen.

FIG. 16 is a diagram showing an AR screen SCC as an example. The AR screen SCC is an example of a screen generated by proceeding to ACT 26 without going through ACT 25 after the processor 101 acquires the camera image IMA shown in FIG. 12 in ACT 17. That is, the AR screen SCC is an example of a screen updated from the AR screen SCA when the clipping result represented by the first clipping data is as shown in FIG. 11, the clipping result represented by the second clipping data is as shown in FIG. 13, and the commodity registration cannot be confirmed.

The processor 101 generates the AR screen SCB by superimposing a CG image showing the four AR tags ATA, ATB, ATC, ATD, and ATE similar to those in FIG. 14, an indicator INB, and a character string CSC on the camera image IMB shown in FIG. 12.

The processor 101 sets the CG image for the AR screen SCC to one showing the AR tags ATA, ATB, ATC, and ATD similar to those in the CG image in the AR screen SCA.

Further, the processor 101 sets the CG image for the AR screen SCC to one showing the character string CSC in which the number of registrations is "4" which is the same as that in the AR screen SCA because the number of registrations is not increased, and the number of commodities-in-basket is "5" according to an increase in the number of commodities-in-basket.

Then, the processor 101 sets the CG image for the AR screen SCC to one showing the indicator INB indicating an occurring mismatch because the number of registrations does not match the number of commodities-in-basket.

As described above, each of the AR screens SCA, SCB, and SCC is obtained by superimposing the CG image allowing the user to identify the registered commodity on the acquired camera image. Then, as in the AR screens SCA, SCB, and SCC, when a commodity newly put into the shopping basket SB (or other container) is detected, if a commodity is registered at a predetermined registration timing with respect to a detection timing thereof, the screen is updated to a new screen enabling the user to identify the commodity newly put into the shopping basket SB. Thus, the processor 101 executes the information processing based on the transaction processing program PRA, and thus functions as a generation unit. The registration timing can be any time within the allowable period as described above for the present embodiment.

Thus, if the AR screen generated in the transaction processing apparatus 100 is transmitted to the cart terminal 400 at an appropriate timing and displayed on the touch panel 404, the customer can confirm the number of item registrations. Then, the customer can recognize that a commodity registration was not appropriately performed when the number of registrations does not match the number of commodities in the shopping basket SB.

Further, based on an AR screen, such as the AR screen SCC shown in FIG. 16, the customer can recognize which commodity was not appropriately registered among the commodities appearing in the camera image. That is, the customer can easily recognize the commodity which is not appropriately registered as a commodity that appears on the AR screen but for which the AR tag is not attached thereto.

If the AR screen generated in the transaction processing apparatus 100 is transmitted to the attendant terminal 300 at an appropriate timing and displayed on the touch panel 304, an attendant can confirm the number of registrations. Then, in a situation where a commodity that was not appropriately registered is in the shopping basket SB, the attendant can recognize this by visually confirming the number of commodities in the shopping basket SB and comparing the number of commodities present with the number of registrations. The attendant can easily recognize the commodity which was not appropriately registered as the commodity that appears on the AR screen but to which the AR tag is not attached, and can point out the commodity which is not appropriately registered to the customer.

In addition, by confirming the camera image displayed on the AR screen, the attendant can confirm an input status of the commodities in the shopping basket SB even when the shopping basket SB cannot be directly viewed by the attendant.

It is assumed that the display on the attendant terminal 300 is performed as follows as an example.

First, on the touch panel 304 of the attendant terminal 300, a monitoring screen in which an outline and a list of operation statuses of the cart terminals 400 present in the store are displayed.

Figure 17:
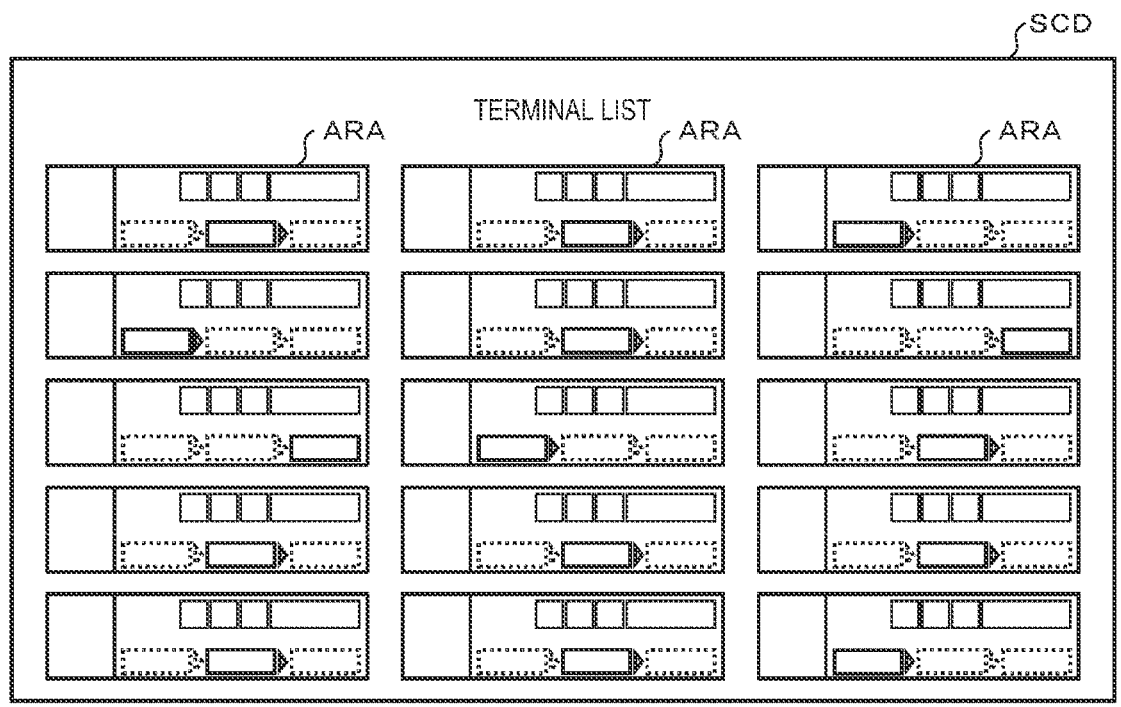
FIG. 17 is a diagram schematically showing a monitoring screen.

FIG. 17 is a diagram schematically showing an entire monitoring screen SCD as an example.

The monitoring screen SCD includes display regions ARA associated with the cart terminals 400 being checked in. In the display region ARA, a status of the transaction being executed for the associated cart terminal 400 is shown. The monitoring screen SCD can display the operation statuses of up to 15 cart terminals 400 at one time, and display the display regions ARA associated with these cart terminals 400 during operation. Therefore, the number of display regions ARA included in the monitoring screen SCD may be fewer than that shown in FIG. 17.

Figure 18:
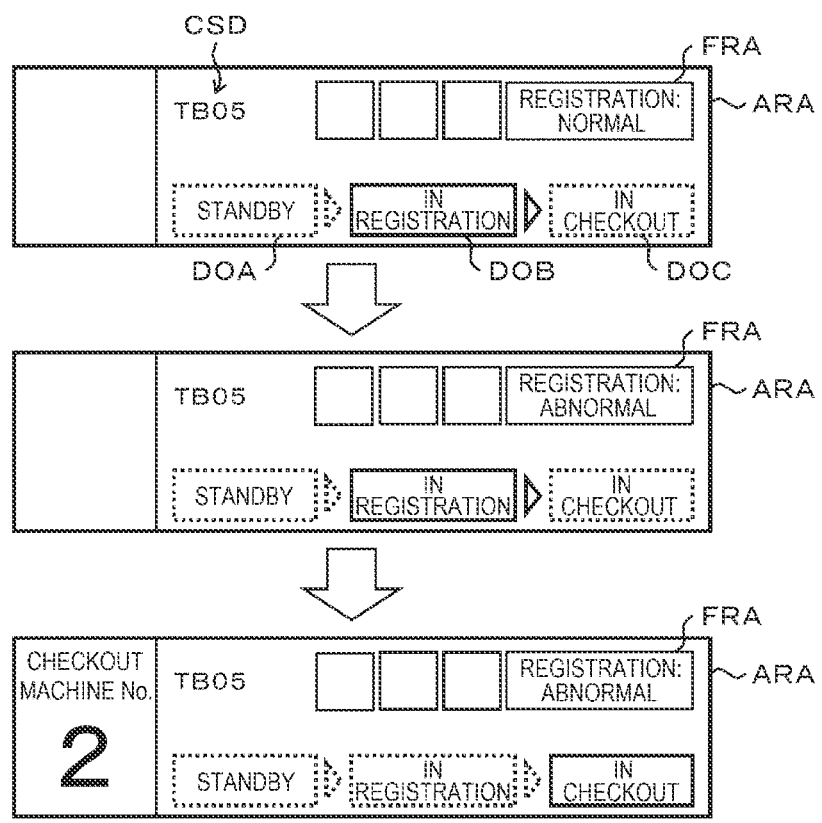
FIG. 18 is a diagram showing details of a display region.

FIG. 18 is a diagram showing details of one display region ARA in FIG. 17.

FIG. 18 shows an example of transition of display in one display region ARA.

In the display region ARA, a character string CSD, a frame line FRA, and display objects DOA, DOB, and DOC are disposed as shown. The character string CSD represents the terminal code of the cart terminal 400. The frame line FRA represents a region indicating a normal or abnormal input status of the commodities in the shopping basket SB. The display objects DOA, DOB, and DOC are associated with respective states of "STANDBY", "IN REGISTRATION", and "IN CHECKOUT". Any one of the display objects DOA, DOB, and DOC can be in an active state, and the remaining two in a non-active state. In FIG. 18, a frame of a display object in the active state is represented by a solid line, and a frame of a display object in the non-active state is represented by a broken line. The non-active state is assumed to be, for example, a gray-out display. The display object DOA is set to the active state before the commodity registration for a transaction is started. The display object DOB is set to the active state while the commodity registration for the transaction is being performed. The display object DOC is set to the active state during checkout for the previously registered commodities of the transaction.

In the attendant terminal 300, the processor 301 displays, for example, a character string "REGISTRATION: NORMAL" as shown in an upper part of FIG. 18 in the frame line FRA of the display region ARA associated with the cart terminal 400 for which the number of registrations matches the number of commodities-in-basket. The processor 301 displays, for example, a character string "REGISTRATION: ABNORMAL" as in a middle part and a lower part of FIG. 18 in the frame line FRA of the display region ARA associated with the cart terminal 400 for which the number of registrations does not match the number of commodities-in-basket.

The monitoring screen SCD may be generated by the processor 101 in the transaction processing apparatus 100, transmitted to the attendant terminal 300, and displayed on the touch panel 304 under the control of the processor 301. Alternatively, the processor 301 may generate the monitoring screen SCD after acquiring various kinds of information from the transaction processing apparatus 100.

Based on display in the display region ARA shown in the upper part of FIG. 18, the attendant can recognize that the commodity registration is performed by the associated cart terminal 400 and the number of registrations matches the number of commodities-in-basket.

Based on display in the display region ARA shown in the middle part of FIG. 18, the attendant can recognize that the commodity registration is performed by the associated cart terminal 400 and the number of registrations does not match the number of commodities-in-basket.

Based on display in the display region ARA shown in the lower part of FIG. 18, the attendant can recognize, from the associated cart terminal 400, that the checkout processing is performed by using the checkout machine 200 specified by a number "No. 2" and the number of registrations does not match the number of commodities-in-basket.

Here, for example, when the attendant recognizes, by the display in the display region ARA shown in the lower part of FIG. 18, that the checkout for a transaction in which the registration of the transaction commodity may not have been appropriately performed is being performed, the attendant instructs the display of the AR screen by a predetermined operation such as tapping an inside of the frame line FRA in the display region ARA. The attendant may also instruct the display of the AR screen at any other time (on-demand).

According to such an instruction, the processor 301 requests to the transaction processing apparatus 100 for the AR screen for the designated the cart terminal 400 associated with the corresponding display region ARA. According to the request, the processor 101 transmits the most recently generated AR screen to the attendant terminal 300. Then, the processor 301 displays the AR screen transmitted from the transaction processing apparatus 100 on the touch panel 304.

Accordingly, the attendant can perform the confirmation work for a customer who uses the checkout machine 200 specified by the number "No. 2".

In some cases, the confirmation work performed by the attendant can be performed in such a way that the attendant picks up the commodity in the shopping basket SB with his or her hand after talking to the customer. Such an action of the attendant may make the customer feel uncomfortable. Therefore, when the cart terminal 400 is started to be used or the like, it is preferable to display, on the touch panel 404, a screen for informing that the store clerk may confirm the commodities if the customer does not follow the use rule(s) for the cart terminal 400. The screen display may be autonomously performed by the processor 401, or may be performed according to an instruction from the processor 101 of the transaction processing apparatus 100.

The processor 101 does not increase the number of commodities-in-basket if a change between a second clipping result and a first clipping result caused by the putting of the commodity into the shopping basket SB does not occur. That is, when the commodity registered as a transaction commodity is not put into the shopping basket SB, the processor 101 does not increase the number of commodities-in-basket, and a difference between the number of registrations and the number of commodities-in-basket occurs. For example, a common situation may be a large commodity that is not easily (or it may be impossible) to be accommodated in the shopping basket SB will not be put into the shopping basket SB. This is a normal situation. In order to make it possible to confirm that such a possible situation is a normal situation, those large or bulky items considered to be difficult to put into the shopping basket SB can be identified as such by providing a flag in a commodity database. Thus, when such an item is registered as a transaction commodity this state can be confirmed by the attendant terminal 300, which is convenient. Specifically, the attendant terminal can know in advance that there will be a large commodity that may not be displayed with an AR tag, which helps the attendant to visually confirm that the customer brings such a commodity when the checkout processing is performed.

Thus, the processor 101 executes the information processing based on the transaction processing program PRA, and outputs the AR screen to the attendant terminal 300 and thus functions as an output unit.

The embodiment can be modified in various manners such as follows.

All or a part of the tag management processing may be executed by the processor 401 in the cart terminal 400.

The scanner 499 may be detachably attached to the cart 900, and the customer can read the bar code of the commodity put into the shopping basket SB with the scanner 499 detached from the cart 900. Further, when the scanner 499 is of a red light/laser scanning type and a scanning light of the scanner 499 can be projected on the camera image, a position of the object newly put into the shopping basket SB may be determined based on the position irradiated with the scanning light.

Instead of or in addition to the scanner 499, a handy scanner that is not fully detachable from the cart 900 may be provided. Then, when the handy scanner is of the red light/laser scanning type, the position of the object newly put into the shopping basket SB may be determined based on the position irradiated with the scanning light in the same manner as described above.

A cart to which a smartphone can be attached such that a camera mounted on the smartphone can image an inside of the shopping basket SB may be used, and a smartphone owned by the customer may be used instead of the cart terminal 400.

The camera image may be captured by a camera attached to the cart.

Apart or all of the functions described as implemented by the processor 101 may instead be implemented by hardware that executes information processing that is not based on a program, such as a logic circuit. The above-described functions may also be implemented by combining software control with the hardware such as the logic circuit described above.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing apparatus for point-of-sale systems, the apparatus comprising:
 a communication interface for connecting to a communication network; and
 a processor configured to:
  acquire an image of an inside of a shopping container via the communication interface;
  detect a commodity in the shopping container in the acquired image;
  receive a commodity identification for a registered commodity in a sales transaction, the registered commodity being registered in the sales transaction using a point-of-sale terminal associated with the shopping container; and
  if the commodity identification for the registered commodity is received within a preset time period around the detection of the commodity in the shopping container, generate a screen image by superimposing commodity information associated with the commodity identification for the registered commodity on the image of the inside of the shopping container for enabling a user to identify the commodity in the shopping container in conjunction with the superimposed commodity information, wherein the processor detects a change in the number of commodities in the shopping container and outputs a notification when the number of commodities in the shopping container fails to match the number of registered commodities in the sales transaction, and the processor is further configured to:

send the generated screen to an attendant terminal via the communication interface.

2. The information processing apparatus according to claim 1, wherein the processor detects the commodity in the shopping container by an object clipping processing on the acquired image.

3. The information processing apparatus according to claim 2, wherein the processor is further configured to detect a second commodity in the shopping container in a second image of the inside of the shopping container acquired via the communication interface.

4. The information processing apparatus according to claim 3, wherein the processor detects the second commodity in the shopping container by an object clipping processing on the acquired second image.

5. The information processing apparatus according to claim 1, wherein the processor detects the change in the number of commodities in the shopping container based on a difference between images of the inside of the shopping container acquired at different times.

6. The information processing apparatus according to claim 1, wherein the generated screen includes a total number of registered commodities in the shopping container and a notification of any detected but unregistered commodity in the shopping container.

7. The information processing apparatus according to claim 1, wherein the generated screen includes a message when a total number of registered commodities in the shopping container does not match a total number of detected commodities in the shopping container.

8. The information processing apparatus according to claim 1, wherein the processor is further configured to:

perform an error processing operation if a commodity is detected in the shopping container in a first image of the shopping container acquired after a startup operation.

9. The information processing apparatus according to claim 8, wherein the error processing operation is causing a guidance screen to be displayed on a display screen of a cart terminal associated with to the shopping container.

10. A point-of-sale system, comprising:

a plurality of cart terminals, each cart terminal including
 a camera positioned to image an inside of a shopping basket of a shopping cart associated with the cart terminal; and an information processing apparatus including:
 a communication interface for connecting to the plurality of cart terminals via a communication network; and
 a processor configured to:
  an image of an inside of a shopping basket from a cart terminal via the communication interface;
  detect a commodity in the shopping basket in the acquired image;

receive a commodity identification for a registered commodity that has been registered in a sales transaction using the cart terminal; and if the commodity identification for the registered commodity is received within a preset time period around the detection of the commodity in the shopping basket, generate a screen image by superimposing commodity information associated with the commodity identification for the registered commodity on the image of the inside of the shopping basket for enabling a user to identify the commodity in the shopping basket in conjunction with the superimposed commodity information, wherein the processor detects a change in the number of commodities in the shopping basket and outputs a notification when the number of commodities in the shopping basket fails to match the number of registered commodities in the sales transaction, and the point-of-sale system further comprises:

an attendant terminal connected to the information processing apparatus via the communication network, wherein the processor of the information processing apparatus is further configured to:

send the generated screen to the attendant terminal via the communication network.

11. The point-of-sale system according to claim 10, wherein the processor detects the commodity in the shopping basket by an object clipping processing on the acquired image.

12. The point-of-sale system according to claim 11, wherein the processor is further configured to detect a second commodity in the shopping basket in a second image of the inside of the shopping basket acquired via the communication network.

13. The point-of-sale system according to claim 10, wherein the processor detects the change in the number of commodities in the shopping basket based on a difference between images of the inside of the shopping basket acquired at different times.

14. The point-of-sale system according to claim 10, wherein the generated screen includes a total number of registered commodities in the shopping basket and a notification of any detected but unregistered commodity in the shopping basket.

15. The point-of-sale system according to claim 10, wherein the generated screen includes a message when a total number of registered commodities in the shopping basket does not match a total number of detected commodities in the shopping container.

16. An information processing method for point-of-sale systems, the method comprising:

acquiring an image of an inside of a shopping container via a communication interface;

detecting a commodity in the shopping container in the acquired image;

receiving, via the communication interface, a commodity identification for a registered commodity in a sales transaction, the registered commodity being registered in the sales transaction using a point-of-sale terminal associated with the shopping container;

if the commodity identification for the registered commodity is received within a preset time period around the detection of the commodity in the shopping container, generating a screen image by superimposing commodity information associated with the commodity identification for the registered commodity on the image of the inside of the shopping container for enabling a user to identify the commodity in the shopping container in conjunction with the superimposed commodity information;

detecting a change in the number of commodities in the shopping container and outputting a notification when the number of commodities in the shopping container fails to match the number of registered commodities in the sales transaction; and sending the generated screen to an attendant terminal via the communication interface.

17. The information processing method according to claim 16, wherein the commodity in the shopping container is detected by an object clipping processing on the acquired image.

\* \* \* \* \*